United States Patent [19]

McEachron et al.

[11] Patent Number: 5,232,469
[45] Date of Patent: Aug. 3, 1993

[54] MULTI-LAYER METAL COATED DIAMOND ABRASIVES WITH AN ELECTROLESSLY DEPOSITED METAL LAYER

[75] Inventors: Roger McEachron, Worthington; Edward J. Connors, Westerville; David E. Slutz, Columbus, all of Ohio

[73] Assignee: General Electric Company, Worthington, Ohio

[21] Appl. No.: 857,139

[22] Filed: Mar. 25, 1992

[51] Int. Cl.$^5$ .............................................. D24B 1/00
[52] U.S. Cl. ........................................ 51/295; 51/293; 51/309
[58] Field of Search ............................ 51/293, 295, 309

[56] References Cited

U.S. PATENT DOCUMENTS

| | | | |
|---|---|---|---|
| 2,746,888 | 5/1956 | Ross | 117/221 |
| 3,465,416 | 9/1969 | Wellborn | 29/473.1 |
| 3,556,839 | 1/1971 | Roy | 117/100 |
| 3,924,031 | 12/1975 | Nicholas et al. | 427/217 |
| 4,063,907 | 12/1977 | Lee et al. | 51/295 |
| 4,289,503 | 9/1981 | Corrigan | 51/307 |
| 4,378,975 | 4/1983 | Tomlinson et al. | 51/309 |
| 4,908,046 | 3/1990 | Wiand | 51/293 |
| 4,945,686 | 8/1990 | Wiand | 51/293 |
| 4,984,940 | 1/1991 | Bryant et al. | 51/295 |
| 5,022,895 | 6/1991 | Wiand | 51/295 |
| 5,024,680 | 6/1991 | Chen et al. | 51/295 |
| 5,049,164 | 9/1991 | Horton et al. | 51/293 |
| 5,075,181 | 12/1991 | Quinto et al. | 51/309 |
| 5,133,782 | 7/1992 | Wiand | 51/295 |

FOREIGN PATENT DOCUMENTS 0004177 9/1978 European Pat. Off. .

Primary Examiner—Mark L. Bell
Assistant Examiner—Willie J. Thompson

[57] ABSTRACT

Multi-layer coated diamond abrasive particles having improved wear performance in abrasive tools are provided, wherein the coating comprises a single homogenous, carbide forming metal primary layer, preferably of chromium, and at least one non-carbide forming secondary layer applied by electroless deposition, preferably comprised of nickel/phosphorus or cobalt/phosphorus.

26 Claims, No Drawings

MULTI-LAYER METAL COATED DIAMOND ABRASIVES WITH AN ELECTROLESSLY DEPOSITED METAL LAYER

BACKGROUND OF THE INVENTION

This invention relates to diamond abrasive particles having a multi-layer metal coating and processes for producing the same. These coated diamond abrasives find particular use in sintered metal bonded tools where the multi-layer coating aids retention of the diamond abrasives within such tools and also aids tool wear resistance.

It is well known in the art that metal coatings can improve the retention of diamond abrasive particles in the matrices of abrasive tools such as those used to saw stone and concrete. Metal coated diamond abrasives are commercially available with nickel coatings typically applied by electroless deposition. While such abrasives provide good performance, improvements are desired to reduce the premature loss of diamond abrasive particles and reduce the wear of abrasive tools.

Nickel coatings applied by electroless deposition chemically bound to the diamond surface. Metals which adhere to diamond surfaces more strongly are well known and include molybdenum, titanium and chromium, which are carbide formers and are typically chemically vapor-deposited or sputtered onto diamond surfaces. Examples of such coatings and processes for depositing them are disclosed in U.S. Pat. No. 3,465,916; EP-A-79/300,337.7; U.S. Reissue No. 34,133; and U.S. Pat. No. 4,063,907. Although these coatings bond more strongly to diamond surfaces than nickel coatings, these coatings are usually oxidized and can be brittle, depending on the carbide formed.

Carbide forming metal layers have been used as part of multi-layer coatings on diamond particles to aid retention within a tool matrix. U.S. Pat. No. 3,924,031 discloses a multi-layer coating for diamond particles wherein the first layer comprises an alloy with a base metal of copper, nickel or iron and a carbide-forming metal such as titanium, chromium or vanadium. This alloy layer may be over coated with another layer such as nickel by electroless or electrolytic deposition. The alloys comprise at most 30 wt % of the carbide forming metal and, to form the carbide, the coating is heated at high temperatures after deposition by vacuum evaporation or sputtering.

U.S. Pat. No. 4,378,975 describes the use of chromium as a first coating on pelletized diamond particles are in turn used to form abrasive bodies. A sintered copper/nickel alloy forms the outer wear-resistant coating on these pelletized particles. It is unknown whether the chromium layer forms a carbide, although green pellets are sintered at temperatures of 900° C. in forming the pelletized particles.

U.S. Pat. No. 5,024,680 describes the use of a chromium, titanium or zirconium carbide-forming layer as part of a multi-layer coating on diamond particles to aid retention within a matrix. Two carbide-forming layers are applied; one thin base layer and a thick oxidation-resistant secondary layer. A Third non-carbide-forming layer applied by electroless techniques is optional. The base carbide layer of chromium, zirconium or titanium is applied by metal vapor deposition, preferably followed by heating of the coated particle to form the carbide. Chemical vapor deposition of this layer is said to provide no advantage. The secondary carbide-forming metal layer of tungsten or tantalum can be applied by CVD followed by heating of the layer to provide adequate carburization.

These procedures for applying multi-layer coatings are complex in that either metal alloys are applied as one of the layers, or three distinct layers are used. In addition, these procedures provide increased bonding strength between the diamond particles and the tool matrix through carburization of the metal coating, during which the diamond particles are exposed to high temperatures. High temperatures can cause degradation of the diamond crystal, which is detrimental to the performance of the cutting tool. Chen et al. (U.S. Pat. No. 5,024,680) recognizes this problem but provides no solution other than to avoid excess carburization.

It is desirable to apply multi-layer coatings to diamond by a simpler method which will aid its retention within the matrix of an abrasive tool without degrading the diamond particle and improve tool wear resistance. It is also desirable to provide multi-layer coatings to diamond which will enhance the wear performance of an abrasive tool.

SUMMARY OF THE INVENTION

Accordingly, it is an object of the present invention to provide metal coated diamond abrasive particles with improved wear performance within sintered metal bonded abrasive tools comprising only two metal layers.

Another object of this invention is to provide a process for making metal coated diamond abrasive particles having a strongly adherent, multi-layer metal coating that aids tool wear performance which does not require exposure of these particles to thermal cycles which cause their degradation.

It is a further object of the present invention to provide abrasive tools with improved wear resistance which comprise multi-layer metal coated diamond abrasive particles having a strongly bonded chromium base layer and a compatible secondary layer (applied by electroless deposition).

Upon further study of the specification and appended claims, further objects and advantages of this invention will become apparent to those skilled in the art.

These and other objects are achieved by a process least two metal layers. A carbide-forming layer provides the primary layer and is chemically bonded to the surfaces of the diamond abrasive particles. These carbide-forming layers are comprised of tungsten, titanium, tantalum, zirconium, molybdenum, hafnium, chromium, vanadium, silicon, niobium, or a carbide, boride, or nitride thereof. The outer metal layer comprises nickel, cobalt, iron, or alloys thereof, applied by electroless deposition. The secondary coating typically ranges from 10–50 wt %, preferably 20–35 wt %, of the uncoated diamond abrasive particles. The abrasive tools provided by this invention comprise multi-layer metal coated diamond abrasive particles bonded within a sintered metal matrix. Conventional methods for bonding the coated particles within a matrix to form tools can be utilized.

DETAILED DESCRIPTION OF THE PREFERRED EMBODIMENTS

Diamond abrasive particles utilized in this invention are of the size conventionally used in sintered metal bonded tools such as, for example, those of 20/80 U.S.

mesh size. The size of the particles can vary widely within the range of 1/1500 μm, preferably 150–1000 μm, and most preferably 200–600 μm. Conventionally sized diamond abrasive particles are sufficiently large so as to provide a cutting profile for the tools desired and not be excessively diluted by the metal coatings to be applied.

The diamond abrasive particles used in this invention can be natural or synthetic but are typically obtained by conversion of graphite under high pressure and high temperature (HP/HT), either with or without a catalyst. Preferably, the diamonds are of a size within the range of from 20 to 80 U.S. mesh and are obtained directly from a conversion process. However, the diamond particles utilized can be obtained from larger sized materials which are milled or pulverized by conventional techniques.

The diamond abrasive particles are initially coated with a carbide-forming metal such as silicon, chromium, titanium, tungsten, zirconium, hafnium, vanadium, niobium, tantalum, molybdenum, or a carbide, boride, or nitride thereof. Chromium is preferred. A suitable method for depositing some of these metals, such as chromium, is a packed salt cementation process operating between about 600°–1000° C. for chromium, preferably between 800°–950° C. Abrasive diamond particles are typically immersed within a molten bath of one or more alkali or alkaline earth halides with the carbide-forming metal. This technique allows for chemical bonding of the carbide-forming metal to the diamond particle surface on formation of metal carbide. The details of a suitable salt bath deposition process can be found in U.S. Pat. No. 2,746,888. The carbide-forming layer can be applied in a wide range of thicknesses. Chromium is preferably at a thickness ranging from 0.1 to 10 μm, more preferably 2–5 μm.

Other methods for applying the primary carbide-forming layer are also suitable if significant chemical bonding is obtained with limited exposure to harmful thermal cycles. Chemical vapor deposition (CVD) techniques are most preferred and, more preferably, low pressure chemical vapor deposition (LPCVD) techniques are used. LPCVD techniques are well known in the art. These techniques utilize reactive gas mixtures at subatmospheric conditions and high substrate temperatures to deposit carbide-forming metals, such as chromium. Prior to coating the diamond abrasive particles, it is preferable to remove oxides and volatile impurities from the surface, particularly surface oxide contaminants. A suitable technique for removing these impurities and depositing metal layers by LPCVD is described in U.S. Pat. No. 4,289,503, which is directed to removing oxides on cubic-boron nitride.

The secondary layer is deposited by electroless deposition to provide tools with improved wear performance. Preferably, these secondary layers are thicker than the primary layer and provide a rough surface.

Non-carbide forming metals are preferred for use as the secondary layer such as nickel, cobalt, and iron. Of these metals, nickel and cobalt are preferred. Preferably, the electroless deposition is preformed from a metal hypophosphite solution. A nickel/hypophosphite solution deposits both nickel and a small percentage of phosphorus (6–11 wt %). A suitable electroless deposition process is described in U.S. Pat. No. 3,556,839.

While the coated abrasive particles of the present invention typically comprise only one primary carbide-forming layer and one non-carbide-forming secondary layer, additional layers of non-carbide-forming metals are optional. For example, thin nickel/phosphorus layers applied by electroless deposition techniques between the chromium layer and outer coatings of cobalt or iron can be used.

The secondary metal coating is preferably applied at a level of about 10–50 wt % of the abrasive particles. Most preferably, the coating is applied in an amount of between 20–35 wt % of the abrasive particles. The primary coating is relatively thin; so the total coating applied may range from above 10 wt % to about 60 wt % of the diamond abrasive. Preferred levels for the total coating fall within the range of 20–40 wt % of the uncoated particles. The thickness of the metal coating may be varied to control properties of tools such as particle retention, lubrication and heat diffusion characteristics. One of ordinary skill in the art can vary the coating thicknesses and diamond granule sizes for the tool intended by routine investigation. After the diamond abrasive particles are coated with multiple metal layers, they are used to form an abrasive tool bonded by a sintered metal.

The coated diamond abrasive particles are impregnated within a suitable metal matrix by conventional techniques when used in abrasive tools. For example, a mixture of the coated abrasives and metal particles can be pressed at ambient temperature to the shape desired and the pressed article heated so as to sinter the metal therein. Suitable metals include nickel, cobalt, etc. Preferred components are tool inserts for saw blades of 30–40 mesh size diamond particles coated with chromium and nickel and bound by a sintered nickel, cobalt, and/or cobalt/bronze matrix. These tool inserts can be of any form or shape, particularly those shapes which are conventional for tools used to cut stone and concrete.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth in degrees Celsius and unless otherwise indicated, all parts and percentages are by weight.

The entire disclosure of all applications, patents and publications, cited above and below, are hereby incorporated by reference.

EXAMPLES

Chromium-Coated Diamond Abrasives

Synthetic diamond abrasive particles under the trade designations MBS-70, MBS-750, and MBS-760, all of 30/40 mesh size, provided by the General Electric Company, are each separately coated with chromium in a salt bath. The salt bath comprises chromium metal and a mixture of salts including sodium chloride, potassium chloride, and calcium chloride. The temperature of the bath is maintained at between 850°–900° C. After about two hours of treatment, the particles have a chromium coating of from 0.5–1.0 μm in thickness.

Titanium-Coated Diamond Abrasives

Synthetic diamond abrasive particles under the trade designations MBS-70, MBS-750, and MBS-760, all of 30/40 mesh size, provided by the General Electric Company, are each separately coated with titanium in a salt bath. The salt bath comprises titanium metal, NaCl, KCl, and $CaCl_2$. The temperature of the bath is between 850–900/C. After about two hours, the particles have a titanium layer of about 0.25–1.0 μm in thickness.

Secondary Coating: Electroless Deposition

Chromium-coated MBS-750 diamond abrasive particles and titanium-coated MBS-750 diamond abrasive particles, as described above, are separately over coated with a cobalt/phosphorus layer by an electroless deposition process consistent with the procedures described in U.S. Pat. No. 3,556,839. Chromium-coated MBS-760 and titanium-coated MBS-760 are separately over coated with a nickel/phosphorus layer. A hypophosphite solution of cobalt or nickel is used as the plating solution. The pH is between 4–5.5 for the nickel solution and 12–14 for the cobalt solution. The process temperature maintained at between 60°–95° C. The metal layers are individually deposited from a series of separate baths. When the nickel or cobalt is depleted, the bath is discarded, and a fresh bath is used until the desired coating weight is obtained. Typically, from 5–20 baths are used, depending on the size of the bath container, the size of the abrasive particles, and the initial concentration of the bath. The nickel/phosphorus layers and the cobalt/phosphorus layers are deposited in an amount of from 20–40 wt %, based on the original weight of the abrasive particles, and have a phosphorus content of from 6–11 wt %.

Secondary Coating: Electrolytic Deposition

Portions of the titanium-coated and chromium-coated MBS-70, MBS-750, and MBS-760 diamond abrasives described above are separately over coated with either a nickel or cobalt layer by a conventional electrolytic deposition technique. The amount of nickel or cobalt applied ranges from 20–40 wt %, based on the original weight of the abrasive particles.

Particle Retention

Uncoated and coated diamond abrasive particles (MBS-70, MBS-750, and MBS760), as described above, are separately bound within test bars using a conventional cobalt matrix for stone-cutting abrasive tools.

The test bars are obtained by mixing the abrasive particles described above with the matrix alloy in powder form in a ratio conventionally used for abrasive tools. The mixture is compressed into the shape of a test bar, sintered at conventional temperatures used for the matrix alloy, and cooled to ambient temperature. The test bars are 2" long, ¼" wide, and ¼" in height.

The relative diamond retention in the bars produced is tested by breaking the bar across its width in an Instrom machine, which applies a constant force (about $2.0 \times 10^4$ m/min.). The percent retention reported in Tables I–III below is equivalent to the percentage of broken diamond crystals across the break of the test bar.

TABLE I

| Abrasive particle MBS-70 | Retention |
| --- | --- |
| Uncoated | 10% |
| Cr | 20% |
| Cr/Co | 33% |
| Cr/Ni | 44% |
| Ti | 6% |

TABLE I-continued

| Abrasive particle MBS-70 | Retention |
| --- | --- |
| Ti/Ni | 52% |

TABLE II

| Abrasive Particle MBS-750 | Retention |
| --- | --- |
| Uncoated | 4% |
| Cr | 17% |
| Cr/Ni | 55% |
| Cr/Co | 56% |
| Cr/Co—P (electroless) | 32% |
| Ti | 8% |
| Ti/Ni | 26% |
| Ti/Co—P (electroless) | 22% |

TABLE III

| Abrasive Particle MBS-760 | Retention |
| --- | --- |
| Uncoated | 2% |
| Cr | 28% |
| Cr/Ni | 47% |
| Cr/Co | 58% |
| Cr/Ni—P (electroless) | 62% |
| Ti | 5% |
| Ti/Ni | 42% |
| Ti/Ni—P (electroless) | 5% |

These results are approximate but show that the coated diamond particles of the invention are significantly superior in retention to uncoated diamond abrasive particles and diamond particles coated with only one layer (chromium or titanium). In addition, this data shows that particles with a multi-layer coating having a primary layer of chromium are consistently superior in retention to particles with a titanium primary layer.

Wear Performance

Synthetic diamond abrasive particles under the trade designations MBS-750 and MBS-760, both of 30/40 mesh size, provided by the General Electric Company, are each coated by the procedures described above in five variations. These include a mono-layer of carbide-forming chromium, a dual layer of carbide-forming chromium, and either an electroless nickel or cobalt layer and a dual layer of carbide-forming chromium and either an electroplated cobalt or nickel layer. The composition and quantity (wt %) of metal coating on the different particles, numbered 1–10, are shown below. The total weight percentages of the combined metal layer coatings on the then different coated particles are as follows:

|  | MBS-750/Particle No. |
| --- | --- |
| Cr-inner | 6.03/1 |
| Cr/Co electroplate | 27.1/2 |
| Cr/Co—P electroless | 23.95/3 |
| Cr/Ni electroplate | 27.13/4 |
| Cr/Ni—P electroless | 25.33/5 |
|  | MBS-760/Particle No. |
| Cr-inner | 4.07/6 |
| Cr/Co electroplate | 24.6/7 |
| Cr/Co—P electroless | 27.89/8 |
| Cr/Ni electroplate | 24.62/9 |
| Cr/Ni—P electroless | 24.8/10 |

The metal coated diamond particles are processed into segments for 7" diameter saw blades. The bond matrix is 100% cobalt, hot-processed under 5000 psi at 850/ for three minutes. A total of nine arc segments (0.240"×0.140"×0.20") are induction-brazed onto a circular steel core to produce 7" nominal diameter blades for testing wear performance.

Prior to testing, each saw blade is conditioned by blade open by sawing a sandstone block and sawing Barre granite under testing conditions to develop a stabilized cutting surface. The blade is then measured at three pre-selected locations long each segment's length (leading edge, center, and trailing edge), and an average of the radial height is calculated for each saw blade. The radial measurements are made to the nearest 0.0001".

The saw tests are conducted on a modified surface grinder sawing Barre granite at the rate of 46.5 in$^2$/min (300 cm$^2$/min). The sawing is carried out under alternating upcut and downcut sawing at a 0.344" (10.0 mm) depth of cut and a traverse rate of 118.1 in/min (3 m/min). The rotational speed of the blade during all tests was fixed at 5904 SFPM (30 m/sec). Water coolant is applied to the blade during sawing at a delivery rate of 3.5 gal/min (38 1/min).

The results of the 7" blade tests are expressed in a wear performance number. This number is calculated by dividing the amount of granite sawed (square inches) by the average blade radial wear in 0.001 inches. Under normal circumstances, the amount of granite sawed by the blades of any particular test series is determined as the minimal amount necessary to generate at least 0.010 inches of radial blade wear. The specific wear performance results are shown in Tables IV-VII.

TABLE IV

Wear Performance of MBS-750 Diamond Coated With Chromium/Cobalt

| Particle No. | Coating | Tests 1 and 2 | Average Wear Life |
|---|---|---|---|
| Control | None | 137/109 | |
| Control | None | 223/186 | 164.3 |
| 2 | Cr/Co | 187/250 | |
| 2 | Cr/Co | 151/236 | 194.8 |
| 3 | Cr/Co—P | 398/295 | |
| 3 | Cr/Co—P | 562/444 | 424.8 |

TABLE V

Wear Performance of MBS-750 Diamond Coated with Chromium and Chromium/Nickel

| Particle No. | Coating | Tests 1 and 2 | Average Wear Life |
|---|---|---|---|
| Control | None | 83/86 | |
| Control | None | 159/104 | 103.5 |
| 1 | Cr | 188/275 | |
| 1 | Cr | 241/152 | 214.0 |
| 4 | Cr/Ni | 151/107 | |
| 4 | Cr/Ni | 152/149 | 139.5 |
| 5 | Cr/Ni—P | 170/137 | |
| 5 | Cr/Ni—P | 146/119 | 143.0 |

TABLE VI

Wear Performance of MBS-760 Diamond Coated with Chromium and Chromium/Cobalt

| Particle No. | Coating | Tests 1 and 2 | Average Wear Life |
|---|---|---|---|
| Control | None | 140/164 | |
| Control | None | 195/246 | 186.3 |
| 6 | Cr | 153/164 | |
| 6 | Cr | 166/231 | 178.5 |
| 7 | Cr/Co | 132/131 | |
| 7 | Cr/Co | 165/191 | 155.3 |
| 8 | Cr/Co—P | 244/179 | |
| 8 | Cr/Co—P | 189.224 | 209.3 |

TABLE VII

Wear Performance of MBS-760 Diamond Coated with Chromium and Chromium/Nickel

| Particle No. | Coating | Tests 1 and 2 | Average Wear Life |
|---|---|---|---|
| Control | None | 178/169 | |
| Control | None | 181/144 | 168.0 |
| 6 | Cr | 196/136 | |
| 6 | Cr | 158/165 | 163.8 |
| 9 | Cr/Ni | 195/135 | |
| 9 | Cr/Ni | 164/148 | 160.5 |
| 10 | Cr/Ni—P | 252/186 | |
| 10 | Cr/Ni—P | 214/162 | 203.5 |

The above data shows that particles with multi-layer coatings having an outer secondary metal coating deposited electrolessly provide superior wear performance over particles with secondary metal coatings deposited electrolytically and also uncoated particles. Some of the multi-layer coatings with a secondary layer of electrolytically deposited cobalt provide superior wear performance over similar particles with only a chromium mono-layer.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An abrasive particle suitable for use in sintered metal bonded abrasive tools comprising a diamond abrasive having a multi-layer coating consisting essentially of one homogeneous carbide forming metal primary layer chemically bonded to the surface of the diamond abrasive and at least one non-carbide forming metal secondary layer deposited electrolessly.

2. An abrasive particle as in claim 1, wherein said non-carbide forming metal secondary layer comprises cobalt/phosphorus, iron/phosphorus, or nickel/phosphorus.

3. An abrasive particle as in claim 2, wherein the amount of said non-carbide forming metal secondary layer ranges from 10 to 50 wt %, based on the weight of the uncoated diamond abrasive particle.

4. An abrasive particle as in claim 2, having two different non-carbide forming metal secondary layers deposited electrolessly.

5. An abrasive particle as in claim 1, wherein the diamond abrasive particles have an average particle size in the range of 1 to 1500 μm.

6. An abrasive particle suitable for use in a sintered metal bonded abrasive tool comprising a diamond abrasive having a multi-layer coating consisting essentially of one homogeneous carbide forming metal primary layer deposited by chemical vapor deposition, or packed salt deposition and a non-carbide forming metal secondary layer deposited by electroless deposition.

7. An abrasive particle as in claim 6, wherein said non-carbide forming metal secondary layer comprises cobalt/phosphorus or nickel/phosphorus.

8. An abrasive particle as in claim 6, wherein the carbide forming metal primary layer has a thickness ranging from 0.1-10 μm.

9. An abrasive particle suitable for use in sintered metal bonded abrasive tools comprising a diamond abrasive having a multi-layer coating consisting essentially of one homogeneous chromium metal primary layer chemically bonded to the surface of the diamond abrasive and at least one non-carbide forming metal secondary layer deposited electrolessly.

10. An abrasive particle as in claim 9, wherein the amount of said non-carbide forming metal secondary layer ranges from 10 to 50 wt %, based on the weight of the uncoated diamond abrasive particle.

11. An abrasive particle as in claim 9, wherein the non-carbide forming metal secondary layer is comprised of one layer of nickel/phosphorus or cobalt/phosphorus.

12. An abrasive particle as in claim 9, having two different non-carbide forming metal secondary layers deposited electrolessly.

13. An abrasive particle as in claim 9, wherein the diamond abrasive particles have an average particle size in the range of 1 to 1500 μm.

14. An abrasive particle suitable for use in a sintered metal bonded abrasive tool comprising a diamond abrasive having a multi-layer coating consisting essentially of one homogeneous chromium metal primary layer deposited by chemical vapor deposition, or packed salt deposition and a non-carbide forming metal secondary layer deposited by electroless deposition.

15. An abrasive particle as in claim 14, wherein said non-carbide forming metal secondary layer comprises cobalt/phosphorus or nickel/phosphorus.

16. An abrasive particle as in claim 14, wherein the chromium metal primary layer has a thickness ranging from 0.1-10 μm.

17. A process for the preparation of coated diamond abrasive particles for use in sintered metal bonded abrasive tools, said process comprising applying one homogeneous carbide forming metal primary layer to the surface of said diamond abrasive particles by chemical vapor deposition or packed salt deposition and applying at least one secondary layer of a non-carbide forming metal by electroless deposition.

18. A process according to claim 17, wherein the homogenous carbide forming metal primary layer consists essentially of chromium and is chemically bonded to the diamond abrasive particle without a separate sintering step.

19. A process according to claim 17, wherein the carbide forming metal primary layer is applied at a thickness ranging from 0.1 to 10 μm, and the secondary layer is applied in an amount in the range of 10-50 wt %, based on the weight of the uncoated diamond abrasive particles.

20. A process according to claim 17, wherein two different secondary layers are applied by electroless deposition.

21. A method according to claim 17, wherein the secondary layer is deposited from at least one of nickel hypophosphite or cobalt hypophosphite solution.

22. A process according to claim 17, comprising the additional steps of mixing the coated diamond abrasive particles with a sinterable metal, pressing the mixture at ambient temperature to form a solid mass of a desired shape and heating the solid mass to a temperature sufficiently high to sinter said sinterable metal.

23. A sintered metal bonded abrasive tool comprising a sintered metal matrix and abrasive particles of claim 1.

24. An abrasive tool which comprises a sintered metal matrix and multi-layer coated diamond abrasive particles wherein the multi-layer coating consists essentially of one homogenous carbide-forming primary metal layer chemically bonded to the surface of the diamond abrasive and at least one non-carbide forming metal secondary layer deposited electrolessly.

25. An abrasive tool according to claim 24, wherein the primary carbide forming metal primary layer is applied by packed salt deposition or chemical vapor deposition and the non-carbide forming metal secondary layer is applied by electroless deposition, and said carbide forming metal primary layer consists essentially of chromium, and said non-carbide forming metal secondary layer comprises cobalt/phosphorus or nickel/phosphorus.

26. An abrasive tool according to claim 24, which is an insert for a saw blade.

* * * * *